(12) United States Patent
Osborn et al.

(10) Patent No.: US 11,268,974 B2
(45) Date of Patent: Mar. 8, 2022

(54) WIND SENSOR DEVICES HAVING A SUPPORT RING ARRANGEMENT, SYSTEMS AND METHODS THEREOF

(71) Applicant: Anemoment LLC, Longmont, CO (US)

(72) Inventors: Timothy Osborn, Longmont, CO (US); Stephen Osborn, Longmont, CO (US); Mark Henault, Westminster, CO (US)

(73) Assignee: Anemoment LLC, Longmont, CO (US)

( * ) Notice: Subject to any disclaimer, the term of this patent is extended or adjusted under 35 U.S.C. 154(b) by 0 days.

(21) Appl. No.: 17/383,733

(22) Filed: Jul. 23, 2021

(65) Prior Publication Data

US 2021/0349120 A1    Nov. 11, 2021

Related U.S. Application Data

(63) Continuation of application No. PCT/US2021/012916, filed on Jan. 11, 2021.

(60) Provisional application No. 62/959,902, filed on Jan. 11, 2020.

(51) Int. Cl.
  *G01P 5/24* (2006.01)
(52) U.S. Cl.
  CPC .................................. *G01P 5/245* (2013.01)
(58) Field of Classification Search
  None
  See application file for complete search history.

(56) References Cited

U.S. PATENT DOCUMENTS

| | | | |
|---|---|---|---|
| 3,727,454 A | 4/1973 | County | |
| 4,787,252 A | 11/1988 | Jacobson | |
| 4,890,488 A | 1/1990 | Pincent | |
| 5,343,744 A | 9/1994 | Ammann | |
| 5,373,736 A | 12/1994 | Brown | |
| 5,650,571 A | 7/1997 | Freud | |

(Continued)

FOREIGN PATENT DOCUMENTS

| | | |
|---|---|---|
| WO | WO2018195385 | 10/2018 |
| WO | WO2019/143426 | 7/2019 |

(Continued)

OTHER PUBLICATIONS

International Search Report and Written Opinion, International App. No. PCT/US2021/012916, dated Apr. 2, 2021, ISA-US.

(Continued)

*Primary Examiner* — Andre J Allen
*Assistant Examiner* — Jermaine L Jenkins
(74) *Attorney, Agent, or Firm* — Wilson Patent Law, LLC

(57) ABSTRACT

Wind sensor devices, systems, and methods are provided in accordance with various embodiments. The wind sensor device may include: a first support ring; a second support ring; a first transducer coupled with the first support ring; a second transducer coupled with the first support ring; a third transducer coupled with the second support ring; and a fourth transducer coupled with the second support ring. A center of a face of the first transducer, a center of a face of the second transducer, a center of a face of the third transducer, and a center of a face of the fourth transducer may form four vertices of a tetrahedron, which may include an equilateral tetrahedron. The first transducer, the second transducer, the third transducer, and the fourth transducer are generally directed away from a center of the tetrahedron.

21 Claims, 16 Drawing Sheets

(56) References Cited

U.S. PATENT DOCUMENTS

| | | | |
|---|---|---|---|
| 5,907,099 | A | 5/1999 | Huang |
| 6,216,544 | B1 | 4/2001 | Adachi |
| 6,244,114 | B1 | 6/2001 | Kowal |
| 6,606,916 | B2 | 8/2003 | Bignell |
| 6,856,273 | B1 | 2/2005 | Bognar |
| 9,279,707 | B2 | 3/2016 | Wiest |
| 9,874,842 | B2 | 1/2018 | Ishida |
| 10,551,406 | B2 | 2/2020 | Osborn |
| 2002/0124662 | A1 | 9/2002 | Suzuki |
| 2015/0082913 | A1 | 3/2015 | Maruyama |
| 2015/0154432 | A1 | 6/2015 | Abedi |
| 2017/0003176 | A1 | 1/2017 | Phan Le |
| 2017/0018830 | A1 | 1/2017 | Henry |
| 2018/0095104 | A1 | 4/2018 | Peters |
| 2018/0313865 | A1 | 11/2018 | Osborn et al. |
| 2019/0128713 | A1 | 5/2019 | Campbell |
| 2019/0317122 | A1 | 10/2019 | Zhang et al. |

FOREIGN PATENT DOCUMENTS

| | | | | |
|---|---|---|---|---|
| WO | WO-2020210355 | A1 * | 10/2020 | ............ G01P 13/02 |
| WO | WO2021/142419 | | 7/2021 | |

OTHER PUBLICATIONS

"All-in-one weather station," [online]. METER Group, Inc., Copyright 2017-2019, [last retrieved on Jul. 22, 2021]. Retrieved from the Internet: <URL: https://www.metergroup.com/environment/products/atmos-41-weather-station>.

Arens, Edward et al., "Measuring 3D indoor air velocity via an inexpensive low-power ultrasonic anemometer," Energy & Buildings, vol. 211, Mar. 15, 2020.

"ATMOS 22 Manual," [online]. METER Group, Inc., Copyright 2017-2019 [last retrieved on Jul. 22, 2021]. Retrieved from the Internet: <URL: http://library.metergroup.com/ Manuals/20419_ATMOS22_Manual_Web.pdf>.

"ATMOS 41 Manual," [online]. METER Group, Inc., Copyright 2018 [last retrieved on Jul. 22, 2021]. Retrieved from the Internet: <URL: http://library.metergroup.com/ Manuals/20635_ATMOS41_Manual_Web.pdf>.

"METER to deliver automatic weather stations for continent-wide TAHMO network," [online]. METER Group, Inc., Jan. 26, J017 [last retrieved on Jul. 22, 2021]. Retrieved from the Internet: <URL: https://www.metergroup.com/news/environment/meter-to-deliver-tahmo-weather-stations>.

"SATI Sonic Brochure," [online]. Applied Technologies, Inc., [last retrieved on Jul. 22, 2021]. Retrieved from the Internet: <URL: https://www.apptech.com/wp-content/uploads/2017/02/SATIflier.pdf>.

"UltraSonic Anemometer," [online]. METER Group, Inc., Copyright 2017-2019 [last retrieved on Jul. 22, 2021]. Retrieved from the Internet: <URL: https://www.metergroup.com/environment/products/atmos-22-sonic-anemometer>.

Yakunin, A.G.,"3D Ultrasonic Anemometer with tetrahedral arrangement of sensors," Journal of Physics: Conf. Series 881, 2017.

International Search Report and Written Opinion, International Appl. No. PCT/US2018/028503, dated Jun. 26, 2018, ISA—US.

Non-Final Office Action, U.S. Appl. No. 15/957,646, dated Apr. 19, 2018, USPTO.

Notice of Allowance, U.S. Appl. No. 15/957,646, dated Nov. 13, 2019, USPTO.

* cited by examiner

WIND SENSOR DEVICES HAVING A SUPPORT RING ARRANGEMENT, SYSTEMS AND METHODS THEREOF

CROSS-REFERENCES TO RELATED APPLICATIONS

This application is a non-provisional patent application that is a continuation of International Application No. PCT/US21/12916, filed on Jan. 11, 2021. This application is a non-provisional patent application claiming priority benefit of U.S. provisional patent application Ser. No. 62/959,902, filed on Jan. 11, 2020, and entitled "WIND SENSOR DEVICES, SYSTEMS, AND METHODS," the entire disclosure of which is herein incorporated by reference for all purposes.

BACKGROUND

A variety of different tools and techniques may be utilized for measurement of fluid flow speed and/or flow direction. For example, ultrasonic anemometers may be utilized to determine wind speed and/or wind direction.

There may be a need for new tools and techniques that may allow for the reduction in size of different systems and/or measurement of the Z-axis wind component.

SUMMARY

Wind sensor devices, systems, and methods are provided in accordance with various embodiments. Some embodiments provide a small, lightweight wind sensor that may have greater capacity for measuring the Z-axis wind component, or three orthogonal directions in general.

Some embodiments include a wind sensor device. The wind sensor device may include: a first support ring; a second support ring; a first transducer coupled with the first support ring; a second transducer coupled with the first support ring; a third transducer coupled with the second support ring; and a fourth transducer coupled with the second support ring. A center of a face of the first transducer, a center of a face of the second transducer, a center of a face of the third transducer, and a center of a face of the fourth transducer may form four vertices of a tetrahedron. In some embodiments of the wind sensor device, the first support ring includes a first circular support ring and the second support ring includes a second circular support ring.

In some embodiments of the wind sensor device, the first transducer and the second transducer are directed at a center along an imaginary line formed between the center of the face of the third transducer and the center of the face of the fourth transducer. The third transducer and the fourth transducer may be directed at a center along an imaginary line formed between the center of the face of the first transducer and the center of the face of the second transducer.

In some embodiments of the wind sensor device, the first support ring and the second support ring are oriented perpendicular to each other. In some embodiments of the wind sensor device, the tetrahedron forms an equilateral tetrahedron. In some embodiments of the wind sensor device, the first transducer, the second transducer, the third transducer, and the fourth transducer are each oriented away from a center of the tetrahedron. In some embodiments of the wind sensor device, the wind sensor device includes no more than four transducers. In some embodiments of the wind sensor device, a center of a back of a first transducer housing, a center of a back of a second transducer housing, a center of a back of a third transducer housing, and a center of a back of a fourth transducer housing form a non-equilateral tetrahedron.

In some embodiments of the wind sensor device, an angle formed between a central axis through the center of the face of the first transducer and an imaginary line formed between the center of the face of the first transducer and the center of the face of the second transducer is greater than 40 degrees. The angle formed between the central axis through the center of the face of the first transducer and the imaginary line formed between the center of the face of the first transducer and the center of the face of the second transducer may be between 52 degrees and 58 degrees. In some embodiments of the wind sensor device, the back of the first transducer housing is coupled with first support ring such that the central axis through the center of the face of the first transducer forms an angle other than 90 degrees with respect to an intersection point between the central axis through the center of the face of the first transducer and a tangent line formed with respect to the first support ring. In some embodiments of the wind sensor device, the back of the first transducer housing is coupled with first support ring such that the central axis through the center of the face of the first transducer forms an angle with respect to the first support ring that depends on at least a size of the first support ring or a length of the first transducer housing.

Some embodiments include a method of wind measurement. The method of wind measurement may include: transmitting a first acoustic signal from a first transducer coupled with a first support ring; transmitting a second acoustic signal from a second transducer coupled with the first support ring; transmitting a third acoustic signal from a third transducer coupled with a second support ring; and transmitting a fourth acoustic signal from a fourth transducer coupled with the second support ring. A center of a face of the first transducer, a center of a face of the second transducer, a center of a face of the third transducer, and a center of a face of the fourth transducer may form four vertices of a tetrahedron.

Some embodiments of the method of wind measurement include: receiving a first portion of the first acoustic signal at the third transducer; receiving a second portion of the first acoustic signal at the fourth transducer; receiving a first portion of the second acoustic signal at the third transducer; receiving a second portion of the second acoustic signal at the fourth transducer; receiving a first portion of the third acoustic signal at the first transducer; receiving a second portion of the third acoustic signal at the second transducer; receiving a first portion of the fourth acoustic signal at the first transducer; and receiving a second portion of the fourth acoustic signal at the second transducer.

Some embodiments of the method of wind measurement further include determining three orthogonal wind speeds based on at least: receiving the first portion of the first acoustic signal at the third transducer; receiving the second portion of the first acoustic signal at the fourth transducer; receiving the first portion of the second acoustic signal at the third transducer; receiving the second portion of the second acoustic signal at the fourth transducer; receiving the first portion of the third acoustic signal at the first transducer; receiving the second portion of the third acoustic signal at the second transducer; receiving the first portion of the fourth acoustic signal at the first transducer; and/or receiving the second portion of the fourth acoustic signal at the second transducer.

In some embodiments of the method of wind measurement, the first transducer and the second transducer are directed at a center along an imaginary line formed between the center of the face of the third transducer and the center of the face of the fourth transducer. The third transducer and the fourth transducer may be directed at a center along an imaginary line formed between the center of the face of the first transducer and the center of the face of the second transducer.

In some embodiments of the method of wind measurement, the first support ring and the second support ring are oriented perpendicular to each other. In some embodiments of the method of wind measurement, the tetrahedron forms an equilateral tetrahedron. In some embodiments of the method of wind measurement, the first transducer, the second transducer, the third transducer, and the fourth transducer are each oriented away from a center of the tetrahedron. In some embodiments of the method of wind measurement, the wind sensor device includes no more than four transducers. In some embodiments of the method of wind measurement, a center of a back of a first transducer housing, a center of a back of a second transducer housing, a center of a back of a third transducer housing, and a center of a back of a fourth transducer housing form a non-equilateral tetrahedron.

In some embodiments of the method of wind measurement, an angle formed between a central axis through the center of the face of the first transducer and an imaginary line formed between the center of the face of the first transducer and the center of the face of the second transducer is greater than 40 degrees. The angle formed between the central axis through the center of the face of the first transducer and the imaginary line formed between the center of the face of the first transducer and the center of the face of the second transducer may be between 52 degrees and 58 degrees. In some embodiments of the method of wind measurement, the back of the first transducer housing is coupled with first support ring such that the central axis through the center of the face of the first transducer forms an angle other than 90 degrees with respect to an intersection point between the central axis through the center of the face of the first transducer and a tangent line formed with respect to the first support ring. In some embodiments of the method of wind measurement, the back of the first transducer housing is coupled with first support ring such that the central axis through the center of the face of the first transducer forms an angle with respect to the first support ring that depends on at least a size of the first support ring or a length of the first transducer housing. In some embodiments of the method of wind measurement, the first support ring includes a first circular support ring and the second support ring includes a second circular support ring.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
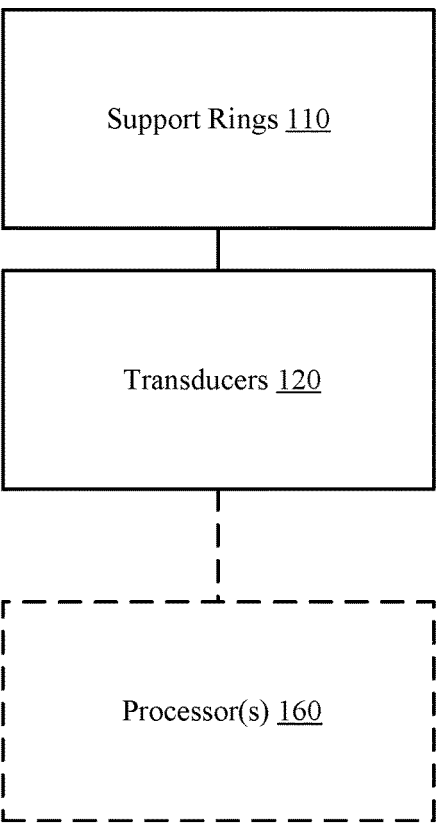
FIG. 1 shows a wind sensor device and/or system in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Wind sensor systems, devices, and methods are provided in accordance with various embodiments. For example, some embodiments include compact three-dimensional ultrasonic anemometers. Some embodiments include tools and techniques that may allow components, such as transmitters and/or receivers (e.g., transducers), of fluid flow measurement systems and/or devices to be positioned closer together while maintaining data accuracy. For example, some embodiments include transducers that are spaced less than 75 millimeters apart. Some embodiments provide for greater capacity for measuring the Z-axis wind component.

Some embodiments provide benefits and differences from other wind sensors. For example, a 6-transducer ultrasonic wind sensor may utilize straight-across acoustic transmissions; the transducers may be arranged at the vertices of a cube. However, they may have only three acoustic paths along the x-y-z axes. In contrast, some wind sensors devices, systems, and/or methods provided in accordance with various embodiments are configured as a tetrahedron inside a sphere, which may utilize fewer transducers (such as the use of four transducers). Some embodiments overcome problems of shadowing, reflection, and/or structural integrity through the use of support rings. Some embodiments allow for 6 acoustic paths along all the edges of the tetrahedron. This may provide for situations where any path affected by the structural shadow may be dropped for even greater 3-dimensional accuracy. Some embodiments utilize 4 acoustic paths along four of the edges of the tetrahedron.

In general, real-time data showing wind direction and/or wind speed may support key decision-making, not only for weather science but also for manufacturing, military, safety, transportation, and other areas of interest. Acoustic anemometry generally uses ultrasonic waves to acquire immediate information about present wind velocity without relying on moving parts subject to mechanical failure in adverse conditions.

Ultrasonic anemometers generally come within the class of flow meters, measuring the passage of a fluid, such as water or air, through a gap between two acoustic transducers, for example. The characteristics of the fluid in the gap may cause detectable changes in the time of flight for sound waves across the gap. Mathematical algorithms may transform the detected changes into data outputs describing the motion of the fluid.

A receiving and transmitting transducer may detect these changes in one dimension. Additional transducers may allow detection in two and three dimensions. Three-dimensional detection may involve multiple transducers positioned to send or receive signals from one or more other transducers. One or more physical support structures may hold the transducers in the proper position for sending and receiving acoustic waves.

Turning now to FIG. 1, a wind sensor device 100 in accordance with various embodiments is provided. In some embodiments, device 100 provides a small, lightweight wind sensor that may have greater capacity for measuring the Z-axis wind component, or three orthogonal directions in general. Device 100 may overcome problems of shadowing, reflection, and/or structural integrity through the use of support rings coupled with fewer transducers than other known devices.

Device 100 may include multiple support structures, such as support rings 110, and multiple transducers 120. Separate receivers and/or transmitters may be utilized in place of transducers 120 in some cases. Transducers 120 may be positioned in a tetrahedral configuration through being coupled with support rings 110, which may facilitate creating tetrahedral acoustic paths. In some embodiments, transducers 120 include wide-beam transducers. The support rings 110 of some embodiments provide support and stability along with facilitating measuring of the Z-axis wind component, and/or three orthogonal directions in general. Some embodiments include one or more processors 160 that may be coupled with the transducers 120 to facilitate measuring wind components, such as three orthogonal wind speeds or a wind velocity in general, which may include a Z-axis wind component.

In some embodiments, the wind sensor device 100 includes: a first support ring from the multiple support rings 110; a second support ring from the multiple support rings 110; a first transducer from the multiple transducers 120 coupled with the first support ring; a second transducer from the multiple transducers 120 coupled with the first support ring; a third transducer from the multiple transducers 120 coupled with the second support ring; and a fourth transducer from the multiple transducers 120 coupled with the second support ring. A center of a face of the first transducer from the multiple transducers 120, a center of a face of the second transducer from the multiple transducers 120, a center of a face of the third transducer from the multiple transducers 120, and a center of a face of the fourth transducer from the multiple transducers 120 may form four vertices of a tetrahedron. In some embodiments of the wind sensor device 100, the tetrahedron forms an equilateral tetrahedron.

In some embodiments of the wind sensor device 100, the first transducer from the multiple transducers 120 and the second transducer from the multiple transducers 120 are directed at a center along an imaginary line formed between the center of the face of the third transducer from the multiple transducers 120 and the center of the face of the fourth transducer from the multiple transducers 120. The third transducer from the multiple transducers 120 and the fourth transducer from the multiple transducers 120 may be directed at a center along an imaginary line formed between the center of the face of the first transducer from the multiple transducers 120 and the center of the face of the second transducer from the multiple transducers 120.

In some embodiments of the wind sensor device 100, the first support ring from the multiple support rings 110 and the second support ring from the multiple support rings 110 are oriented perpendicular to each other. In some embodiments of the wind sensor device 100, the first transducer from the multiple transducers 120, the second transducer from the multiple transducers 120, the third transducer from the multiple transducers 120, and the fourth transducer from the multiple transducers 120 are each oriented away from a center of the tetrahedron. In some embodiments of the wind sensor device 100, the wind sensor device 100 includes no more than four transducers from the multiple transducers 120. In some embodiments of the wind sensor device 100, a center of a back of a first transducer housing, a center of a back of a second transducer housing, a center of a back of a third transducer housing, and a center of a back of a fourth transducer housing form a non-equilateral tetrahedron.

In some embodiments of the wind sensor device 100, an angle formed between a central axis through the center of the face of the first transducer from the multiple transducers 120 and an imaginary line formed between the center of the face of the first transducer from the multiple transducers 120 and the center of the face of the second transducer from the multiple transducers 120 is greater than 40 degrees. The angle formed between the central axis through the center of the face of the first transducer from the multiple transducers 120 and the imaginary line formed between the center of the face of the first transducer from the multiple transducers 120 and the center of the face of the second transducer from the multiple transducers 120 may be between 52 degrees and 58 degrees. In some embodiments of the wind sensor device 100, the back of the first transducer housing is coupled with first support ring such that the central axis through the center of the face of the first transducer forms an angle other than 90 degrees with respect to an intersection point between the central axis through the center of the face of the first transducer from the multiple transducers 120 and a tangent line formed with respect to the first support ring from the multiple support rings 110. In some embodiments of the wind sensor device, the back of the first transducer housing is coupled with first support ring such that the central axis through the center of the face of the first transducer from the multiple transducers 120 forms an angle with respect to the first support ring from the multiple support rings 110 that depends on at least a size of the first support ring from the multiple support rings 110 or a length of the first transducer housing.

In some embodiments of the wind sensor device 100, the first support ring from the multiple support rings 110 includes a first circular support ring and the second support ring from the multiple support rings 110 includes a second circular support ring.

Turning now to FIG. 2A, FIG. 2B, FIG. 2C, and FIG. 2D, a wind sensor device 100-a is provided in accordance with various embodiments. Device 100-a may be an example of device 100 of FIG. 1. Device 100-a includes transducers 120-a, 120-b, 120-c, and 120-d along with support rings 110-a and 110-b. Transducers 120-a and 120-b may be coupled with support ring 110-a; transducers 120-c and 120-d may be coupled with support ring 110-b. In general, transducer housings (such as transducer housings 128-a, 128-b, 128-c, and 128-d) may facilitate the coupling. Some embodiments may include a base 115 that may couple with support rings 110-a and/or 110-b. Device 100-a may include no more than four transducers, such as transducers 120-a, 120-b, 120-c, and 120-d, which may provide a benefit in utilizing fewer transducers while also being able to provide for measurements in three orthogonal directions.

Support rings 110-a and 110-b may be configured as circular support rings, though other ring shapes may be utilized such as oval shapes, egg shapes, etc. As shown, support rings 110-a and 110-b are oriented with respect to each other such that they are perpendicular to each other. Support rings 110-a and 110-b may not be continuous; for example, support rings 110-a and 110-b may have gaps, which may facilitate coupling the two support rings with each other.

The transducers 120-a, 120-b, 120-c, and 120-d may be coupled with respective support rings 110-a and 110-b such that a center 121-a of a face of the transducer 120-a, a center 121-b of a face of the transducer 120-b, a center 121-c of a face of the transducer 120-c, and a center 121-d of a face of the transducer 120-d form four vertices of a tetrahedron 125 (see long dash short dash short dash lines that form the edges of the tetrahedron 125). In general, the transducers 120-a, 120-b, 120-c, and 120-d are each oriented away from a center of the tetrahedron 125. As shown in FIG. 2B and FIG. 2C, the tetrahedron 125 forms an equilateral tetrahedron.

Merely by way of example, the transducer 120-a and the transducer 120-b may be directed (see dashed lines 122-a and 122-b) at a center 123-a along an imaginary line 124-a formed between the center 121-c of the face of the transducer 120-c and the center 121-d of the face of the transducer 120-d (see FIG. 2B, for example). The transducer 120-c and the transducer 120-d may be directed (see dashed lines 122-c and 122-d) at a center 123-b along an imaginary line 124-b formed between the center 121-a of the face of the transducer 120-a and the center 121-b of the face of the transducer 120-b (see FIG. 2C, for example).

Figure 2A:
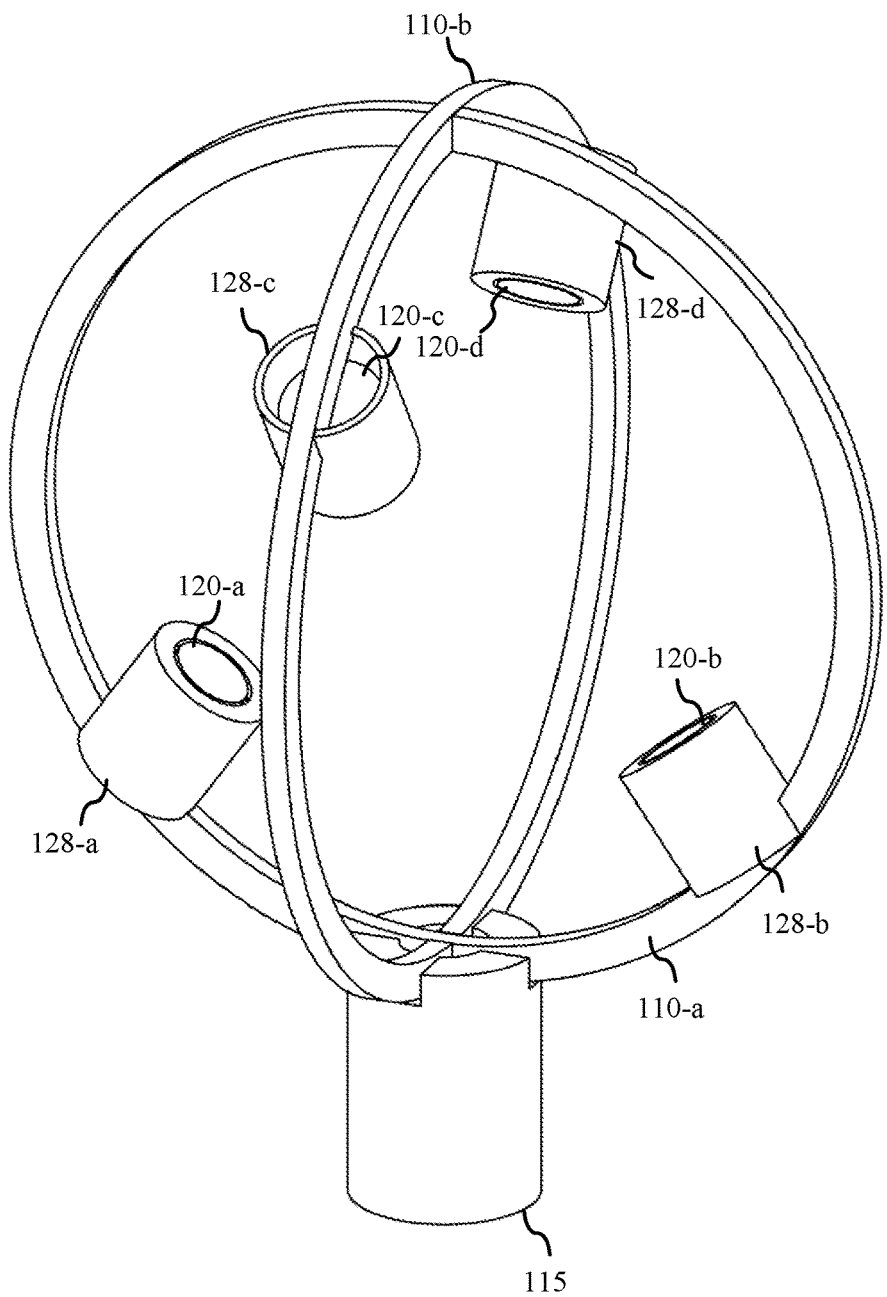
FIG. 2A, FIG. 2B, FIG. 2C, and FIG. 2D show a wind sensor device in accordance with various embodiments.
Figure 2B:
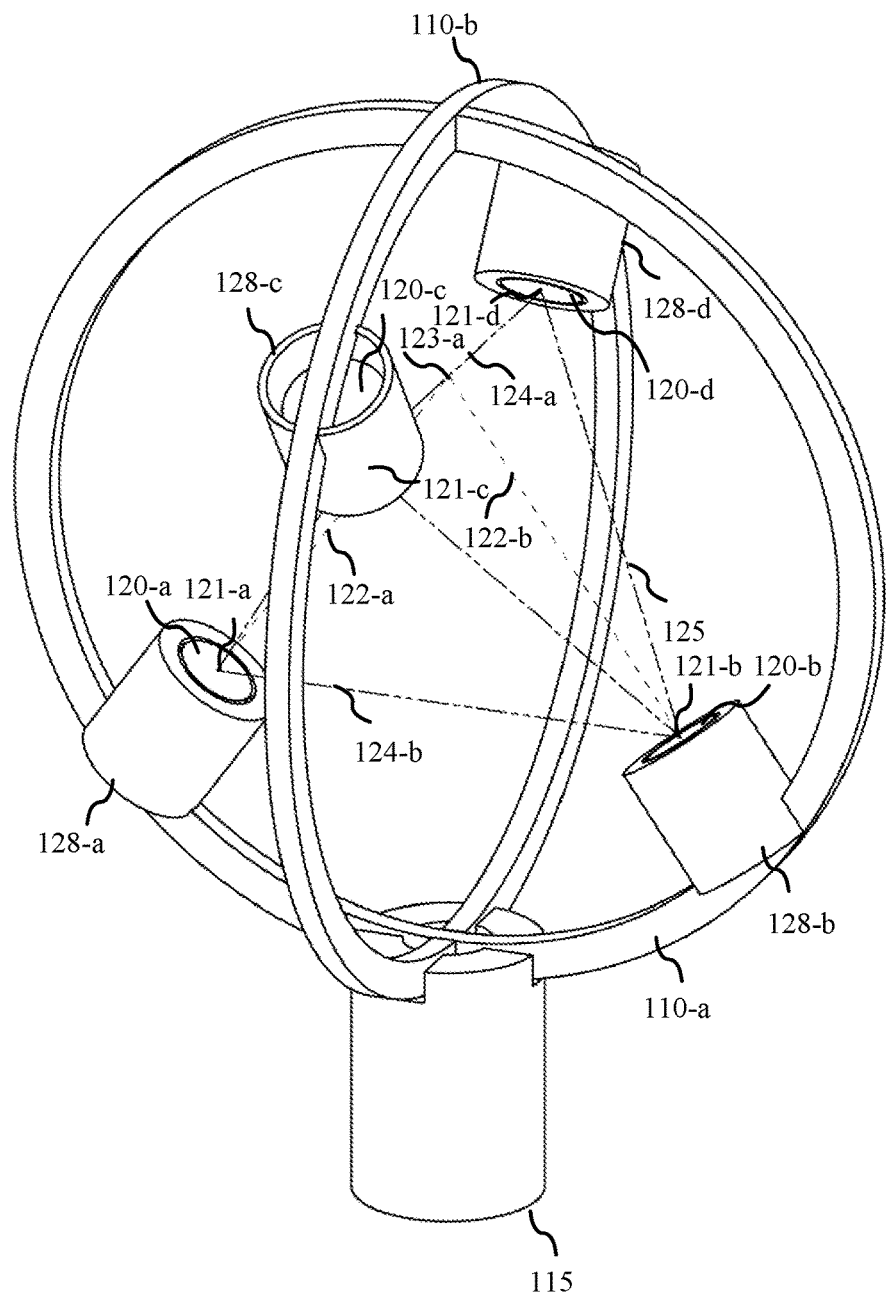
Figure 2C:
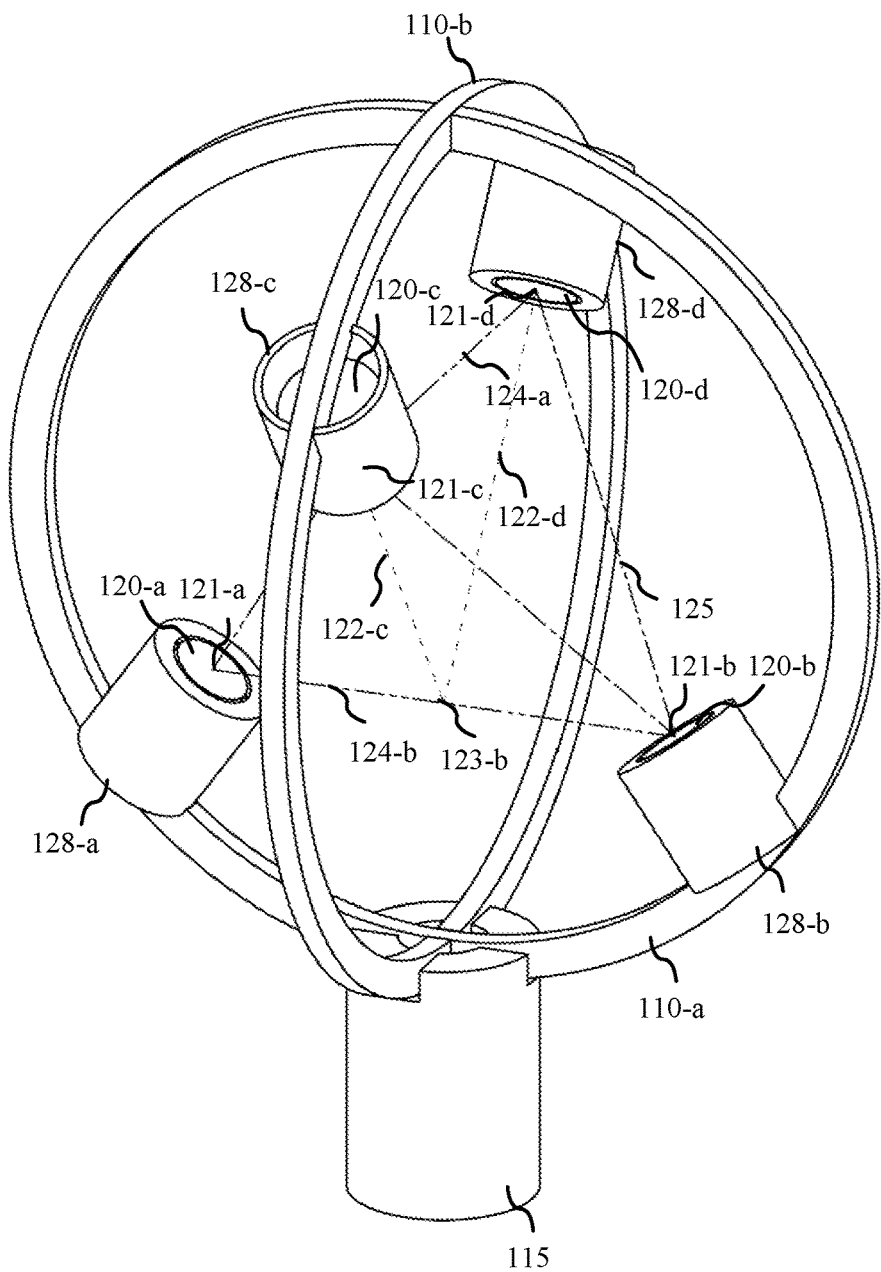
Figure 2D:
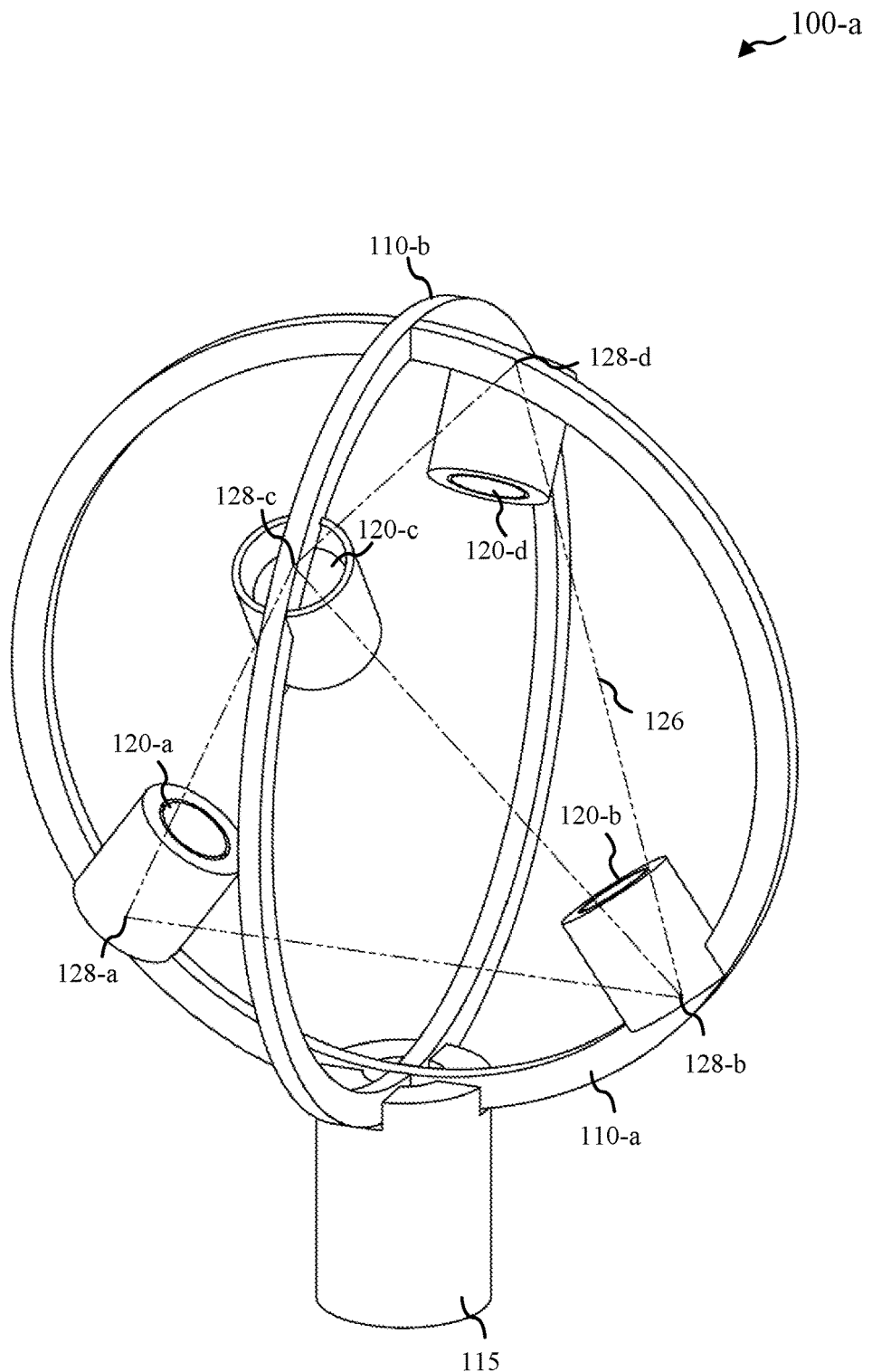

The general configuration shown in FIG. 2A, FIG. 2B, FIG. 2C, and/or FIG. 2D, an angle formed between the central axis (see dashed line 122-a) through the center 121-a of the face of the transducer 120-a and the imaginary line 124-b formed between the center 121-a of the face of the transducer 120-a and the center 121-b of the face of the transducer 120-b may be greater than 40 degrees. Similarly, an angle formed between the central axis (see dashed line 122-b) through the center 121-b of the face of the transducer 120-b and the imaginary line 124-b formed between the center 121-a of the face of the transducer 120-a and the center 121-b of the face of the transducer 120-b may be greater than 40 degrees. With respect to transducers 120-c and 120-d, an angle formed between the central axis (see dashed line 122-c) through the center 121-c of the face of the transducer 120-c and the imaginary line 124-a formed between the center 121-c of the face of the transducer 120-c and the center 121-d of the face of the transducer 120-d may be greater than 40 degrees; an angle formed between the central axis (see dashed line 122-d) through the center 121-d of the face of the transducer 120-d and the imaginary line 124-a formed between the center 121-c of the face of the transducer 120-c and the center 121-d of the face of the transducer 120-d may be greater than 40 degrees.

FIG. 2B and FIG. 2C also provide examples where the angle formed between the central axis (see dashed line 122-a) through the center 121-a of the face of the transducer 120-a and the imaginary line 124-b formed between the center 121-a of the face of the transducer 120-a and the center 121-b of the face of the transducer 120-b may be between 52 degrees and 58 degrees. Similarly, the angle formed between the central axis (see dashed line 122-b) through the center 121-b of the face of the transducer 120-b and the imaginary line 124-b formed between the center 121-a of the face of the transducer 120-a and the center 121-b of the face of the transducer 120-b may between 52 degrees and 58 degrees. With respect to transducers 120-c and 120-d, the angle formed between the central axis (see dashed line 122-c) through the center 121-c of the face of the transducer 120-c and the imaginary line 124-a formed between the center 121-c of the face of the transducer 120-c and the center 121-d of the face of the transducer 120-d may be between 52 degrees and 58 degree; the angle formed between the central axis (see dashed line 122-d) through the center 121-d of the face of the transducer 120-d and the imaginary line 124-a formed between the center 121-c of the face of the transducer 120-c and the center 121-d of the face of the transducer 120-d may be between 52 degrees and 58 degrees.

FIG. 2A, FIG. 2B, FIG. 2C, and FIG. 2D also provide embodiments where the back of the transducer housing 128-a may be coupled with support ring 110-a such that the central axis (see dashed line 122-a) through the center 121-a of the face of the transducer 120-a forms an angle other than 90 degrees with respect to an intersection point between the central axis 122-a through the center 121-a of the face of the transducer 120-a and a tangent line formed with respect to the support ring 110-a; this may be noted by the orientation of the transducer housing 128-a with respect to the support ring 110-a. Similarly, the back of the transducer housing 128-b may be coupled with support ring 110-a such that the central axis (see dashed line 122-b) through the center 121-b of the face of the transducer 120-b forms an angle other than 90 degrees with respect to an intersection point between the central axis 122-b through the center 121-b of the face of the transducer 120-b and a tangent line formed with respect to the support ring 110-b; this may be noted by the orientation of the transducer housing 128-b with respect to the support ring 110-a. Similarly, the back of the transducer housing 128-c may be coupled with support ring 110-b such that the central axis (see dashed line 122-c) through the center 121-c of the face of the transducer 120-c forms an angle other than 90 degrees with respect to an intersection point between the central axis 122-c through the center 121-c of the face of the transducer 120-c and a tangent line formed with respect to the support ring 110-b; this may be noted by the orientation of the transducer housing 128-c with respect to the support ring 110-b; the back of the transducer housing 128-d may be coupled with support ring 110-*b* such that the central axis (see dashed line 122-*d*) through the center 121-*d* of the face of the transducer 120-*d* forms an angle other than 90 degrees with respect to an intersection point between the central axis 122-*d* through the center 121-*d* of the face of the transducer 120-*c* and a tangent line formed with respect to the support ring 110-*b*; this may be noted by the orientation of the transducer housing 128-*d* with respect to the support ring 110-*b*.

In general, the back of each respective transducer housing 128-*a*, 128-*b*, 128-*c*, and/or 128-*d* may be coupled with the respective support ring 110-*a* or 110-*b* such that the respective central axis 122-*a*, 122-*b*, 122-*c*, or 122-*d* through the respective center 121-*a*, 121-*b*, 121-*c*, or 121-*d* of the face of the respective transducers 120-*a*, 120-*b*, 120-*c*, or 120-*d* may form an angle with respect to the respective support ring 110-*a* or 110-*b* that depends on at least a size of the respective support ring 110-*a* or 110-*b* or a length of the respective transducer housing 128-*a*, 128-*b*, 128-*c*, or 128-*d*.

FIG. 2D generally highlights how a center of a back of a transducer housing 128-*a* of transducer 120-*a*, a center of a back of a transducer housing 128-*b* of transducer 120-*b*, a center of a back of a transducer housing 128-*c* of transducer 120-*c*, and a center of a back of a transducer housing 128-*d* of transducer 120-*d* may form a non-equilateral tetrahedron 126 (see long dash short dash short dash lines that form the edges of the tetrahedron 126). Device 100-*a* with the noted equilateral tetrahedron 125 (see, e.g., FIG. 2B or FIG. 2C) and the non-equilateral tetrahedron 126 (see, e.g., FIG. 2D) generally reflects the innovative orientations that the transducers 120 and their respective housings 128 may take with respect to the support rings 110, which may facilitate strong signals being received by receiving transducers 120.

Figure 3A:
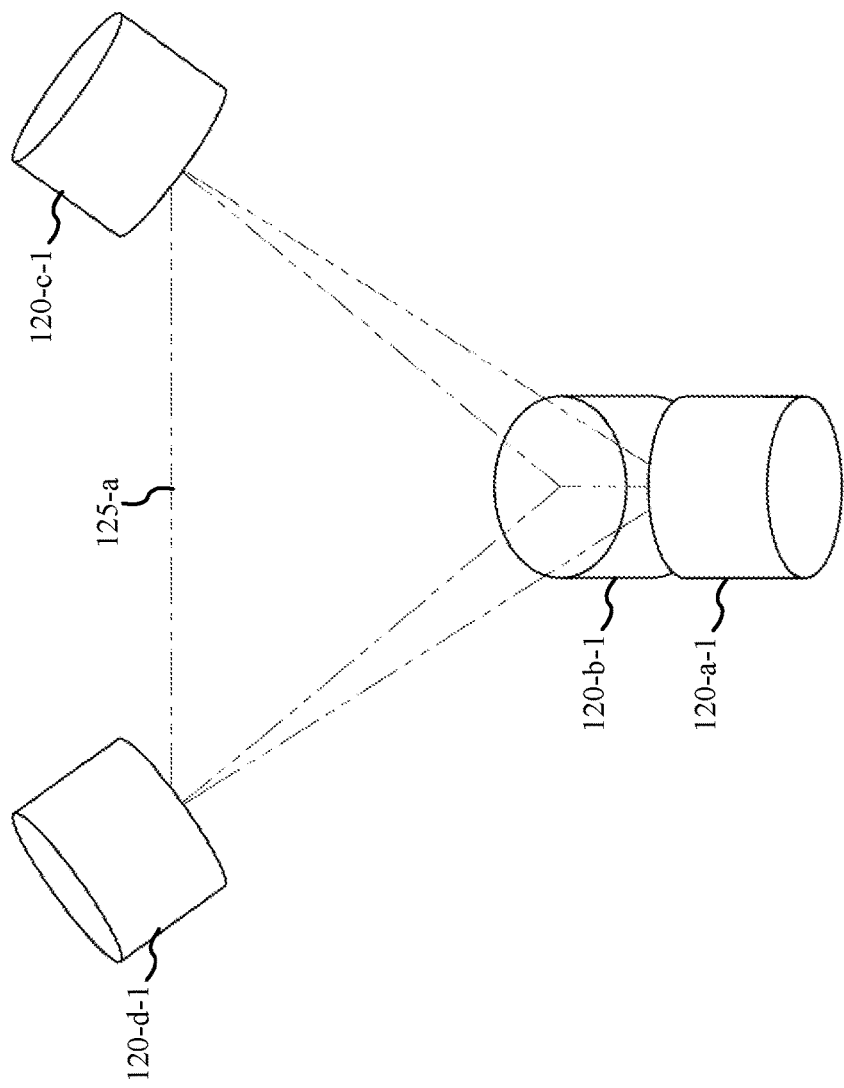
FIG. 3A, FIG. 3B, and FIG. 3C show aspects of a wind sensor device in accordance with various embodiments.
Figure 3B:
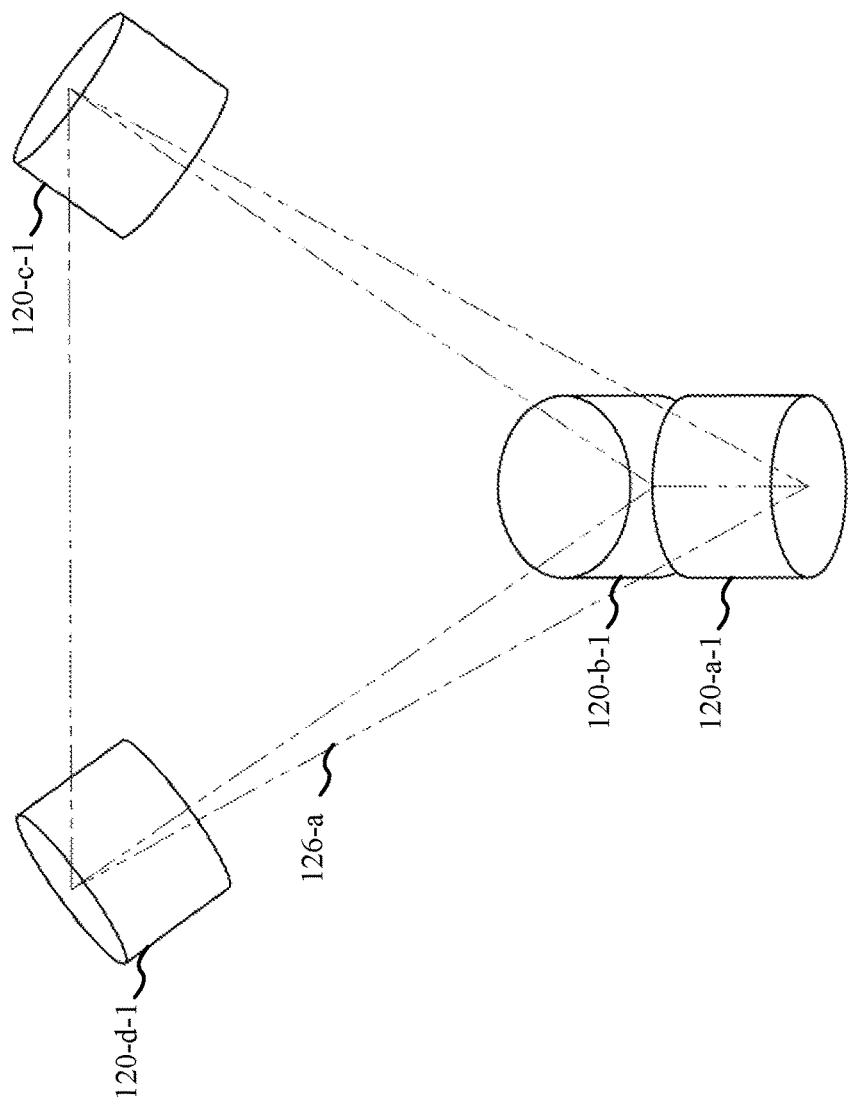

Turning now to FIG. 3A and FIG. 3B, a transducer arrangement 101 in accordance with various embodiments is shown. Transducer arrangement 101 may be example of the arrangement of transducers as described and/or shown with respect to FIG. 1 and/or FIG. 2A-FIG. 2D. Transducer arrangement 101 shows four transducers 120-*a*-1, 120-*b*-1, 120-*c*-1, and 120-*d*-1. These figures generally highlight how inner tetrahedron 125-*a* (see long dash short dash short dash lines that form the edges of the tetrahedron 125-*a* of FIG. 3A, for example) may take the form of an equilateral tetrahedron while the outer tetrahedron 126-*a* (see long dash short dash short dash lines that form the edges of the tetrahedron 126-*a* of FIG. 3B, for example) may form a non-equilateral triangle. This difference between tetrahedron 125-*a* and 126-*a* generally arises from the four transducers 120-*a*-1, 120-*b*-1, 120-*c*-1, and 120-*d*-1 being directed away from the center of tetrahedron 125-*a* at various angles. In some embodiments, transducers 120-*a*-1, 120-*b*-1, 120-*c*-1, and 120-*d*-1 may be oriented away from the center of the tetrahedron 125-*a* such that they are oriented along a respective face of the tetrahedron 125-*a* or some other angle away from the center of the tetrahedron 125-*a* and a respective face of the tetrahedron 125-*a*. The four transducers 120-*a*-1, 120-*b*-1, 120-*c*-1, and 120-*d*-1 are generally shown such that they (or their respective faces) are placed at each of the four vertexes of equilateral tetrahedron 125-*a*. The tetrahedron 125-*a* may be oriented with two vertexes on a horizontal plane, with the other two vertexes on a parallel horizontal plane, creating an upper transducer pair 120-*c*-1 and 120-*d*-1 and a lower transducer pairs 120-*a*-1 and 120-*b*-1. The effect is that each transducer may be aimed at the center of an imaginary line between the transducers on the parallel plane. The transducer may be aimed to transmit along the center of the equilateral triangular face of the tetrahedron 125-*a*.

Figure 3C:
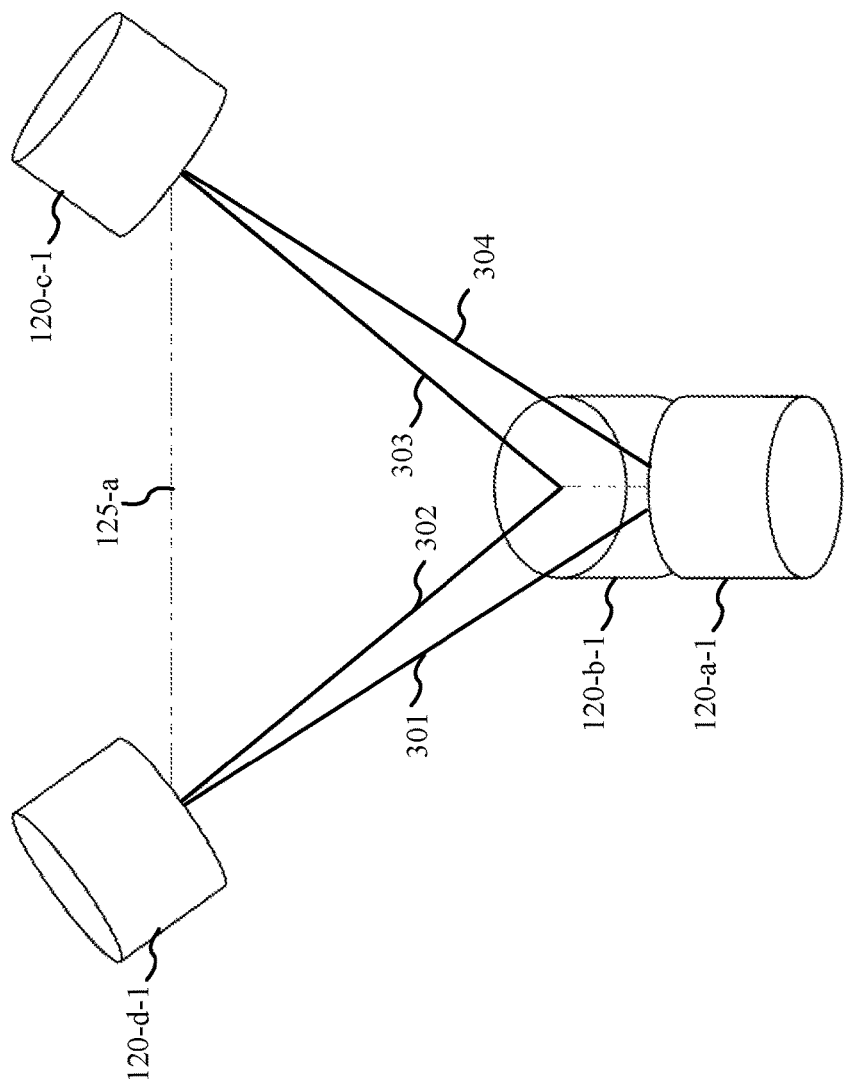

FIG. 3C shows transducer configuration 101 in particular to highlight several acoustic propagation paths 301, 302, 303, and 304 between respective pairs transducers 120-*a*-1, 120-*b*-1, 120-*c*-1, and 120-*d*-1 that may facilitate wind speed and/or wind velocity measurements, including measuring three orthogonal wind speeds. The speed of sound C may be determined from the time of flight T1, T2 measured in both directions along each acoustic propagation path 301, 302, 303, and 304 between respective pairs of the transducers 120-*a*-1, 120-*b*-1, 120-*c*-1 and 120-*d*-1 and the distance L between the two transducers:

$$C = \frac{L}{2}\left\{\frac{1}{T1} + \frac{1}{T2}\right\}.$$

Similarly, a wind speed V may be determined with similar information:

$$V = \frac{L}{2}\left\{\frac{1}{T1} - \frac{1}{T2}\right\}.$$

Through determining at least three wind speeds between three pairs of transducers, one may reconstruct the total wind speed and direction of the wind flowing through the sensor.

Merely by way of example, an acoustic signal may be transmitted from the transducer 120-*a*-1; a first portion of the acoustic signal from the transducer 120-*a*-1 may be at the transducer 120-*c*-1 along acoustic propagation path 304; a second portion of the acoustic signal from transducer 120-*a*-1 may be received at the transducer 120-*d*-1 along acoustic path 301. An acoustic signal may be transmitted from the transducer 120-*b*-1; a first portion of the acoustic signal from transducer 120-*b*-1 may be received at the transducer 120-*c*-1 along acoustic path 303; a second portion of the acoustic signal from transducer 120-*b*-1 may be received at the transducer 120-*d*-1 along acoustic propagation path 302. An acoustic signal may be transmitted from the transducer 120-*c*-1; a first portion of the acoustic signal transmitted from the transducer 120-*c*-1 may be received at transducer 120-*a*-1 along acoustic propagation path 304 and a second portion of the acoustic signal transmitted from the transducer 120-*c*-1 may be received at transducer 120-*b*-1 along acoustic propagation path 303. An acoustic signal may be transmitted from the transducer 120-*d*-1; a first portion of the acoustic signal transmitted from the transducer 120-*d*-1 may be received at transducer 120-*a*-1 along acoustic propagation path 301 and a second portion of the acoustic signal transmitted from the transducer 120-*d*-1 may be received at transducer 120-*b*-1 along acoustic propagation path 302. The transmitted signals from transducers 120-*a*-1, 120-*b*-1, 120-*c*-1, and 120-*d*-1 can happen in a variety of orders and may form one or more cycles. Merely by way of example, a sequence of transmission may occur as transducer 120-*a*-1, 120-*b*-1, 120-*c*-1, and 120-*d*-1. Another sequence of transmissions may occur as transducers 120-*a*-1, 120-*d*-1, 120-*b*-1, and 120-*d*-1. Another sequence of transmissions may occur as transducers 120-*a*-1, 120-*c*-1, 120-*b*-1, and 120-*d*-1. Other orders may be utilized, including different transducers starting the sequence. From these transmitted and received signals, multiple time of flights may be determined from which wind speeds and/or wind velocities may be determined, including determined three orthogonal wind speeds.

To further understand how transducers 120 may be aligned and coupled with support structures, such as ring supports 110, in accordance with various embodiments, the following provides further explanation that may facilitate construction of wind sensor devices in accordance with various embodiments. In general, a transducer may transmit and receive acoustic pattern, which generally takes the shape of a cone. The placement of the transducer faces generally fall on an equilateral or regular tetrahedron. The transducers may be mounted on support rings on a non-equilateral tetrahedron, which may impact the scaling of the size of the devices in accordance with various embodiments.

In general, an ultrasonic transducer emits sound from its face in the form of a cone, where the center of the cone is generally the strongest signal and the strength of the signal generally weakens as the receiver moves off of the center line of the cone. The further from the center line of the cone, the weaker the signal generally becomes. The greater the distance between transducers, the weaker the signal generally becomes. One of the benefits of the various devices, systems, and methods provided in accordance with various embodiments as they may allow for small spacings between transducers. For example, the distance between transducers may be less than 100 millimeters; some embodiments utilize distances of approximately 50 millimeters (+/−15 millimeters).

In some embodiments, four transducers are placed at each of the four vertexes of an equilateral tetrahedron. The tetrahedron is generally oriented with two vertexes on a horizontal plane containing imaginary line 124-a, for example, with the other two vertexes on a parallel horizontal plane containing imaginary line 124-b, for example, creating "upper" and "lower" transducer pairs (see FIG. 2B and/or FIG. 2C, for example). The effect is that each transducer may be aimed at the center of imaginary line 124-a or 124-b between the transducers on the parallel planes defined by imaginary lines 124-a and 124-b. The transducer cone may be transmitting along the center of the equilateral triangular face of the tetrahedron.

From the horizontal plane containing imaginary line 124-b, for example, the transducers may be mounted at the Face-Vertex-Edge angle of the tetrahedron 125 formed by imaginary line 124-b and imaginary line 122-b that the following equation defines as the TransducerAngle:

$$TransducerAngle = ARCCOS\left(\frac{1}{\sqrt{3}}\right)$$

Turning now to FIG. 4A, FIG. 4B, FIG. 4C, FIG. 4D, FIG. 4E, FIG. 4F, and FIG. 4G, vertical slice perspectives of aspects of a wind device 100-b in accordance with various embodiments are provided. Device 100-b may be an example of aspects of device 100 of FIG. 1, device 100-a of FIGS. 2A-2D, and/or transducer configuration 101 of FIGS. 3A-3C. These figures may further facilitate an understanding of the orientation of the transducers in accordance with various embodiments. These figures show a pair of transducers 120-a-2 and 120-b-2 (called out with respect to the face of each respective transducer), along with their respective housings 128-a-2 and 128-b-2, and a support ring 110-a-2. A similar configuration of two transducers coupled with a support ring may be formed that may be flipped by 180 degrees around a horizontal axis and then rotated by 90 degrees around a vertical access to form a second support ring with two transducers that may be coupled with device 100-b to form a wind sensor device with two support rings and four transducers in accordance with various embodiments.

Figure 4A:
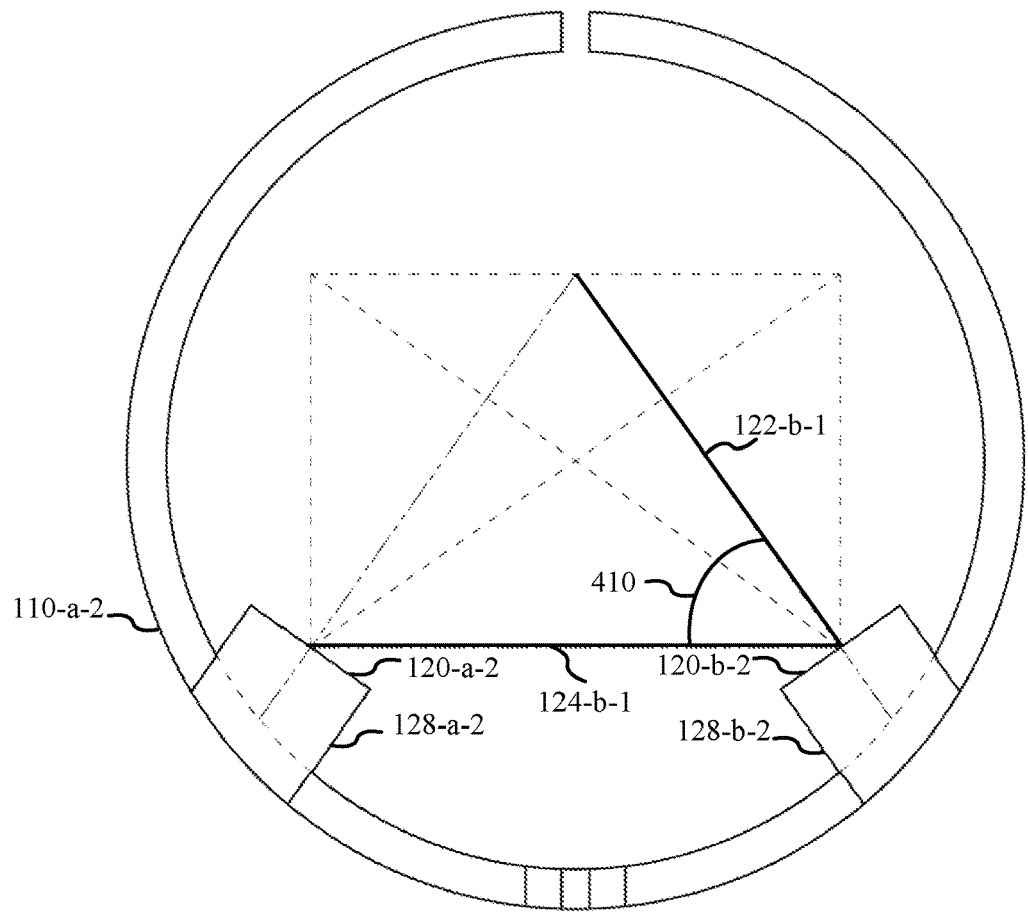
FIG. 4A, FIG. 4B, FIG. 4C, FIG. 4D, FIG. 4E, FIG. 4F, and FIG. 4G show aspects of a wind sensor device in accordance with various embodiments.

FIG. 4A provides a vertical slice perspective through the lower pair of transducers 120-a-1 and 120-b-2 that highlights the Face-Vertex-Edge Angle 410 formed by the imaginary lines 124-b-1 and 122-b-1. It may be helpful to note that the transducers are generally not aimed at the center of the triangular face opposite of the vertex where the transducer is mounted. Aiming at the line between the two transducers on the parallel plane generally provides a stronger acoustic signal. In some embodiments, the angle difference between the center of the line between transducers is about 19.47 degrees closer to the center of the transducer acoustic cone, which may provide a stronger receive signal.

In general, the transducers are mounted from the back side of the transducers on a support ring, such as support ring 110-a-2. If a device, such as device 100-b, is scaled, the angle of attachment to the support ring and the mounting position on the support ring generally changes as the spacing between transducers is scaled to maintain the correct transducer angle at the face of the transducers.

Determining the transducer angle on the mounting ring and the mounting location may be complicated. The tetrahedron that defines the position of the faces of the transducers is generally an equilateral tetrahedron. However, because the transducers may not be pointing to the center of the tetrahedron, the tetrahedron that forms the back side of the transducers may not be equilateral.

Figure 4B:
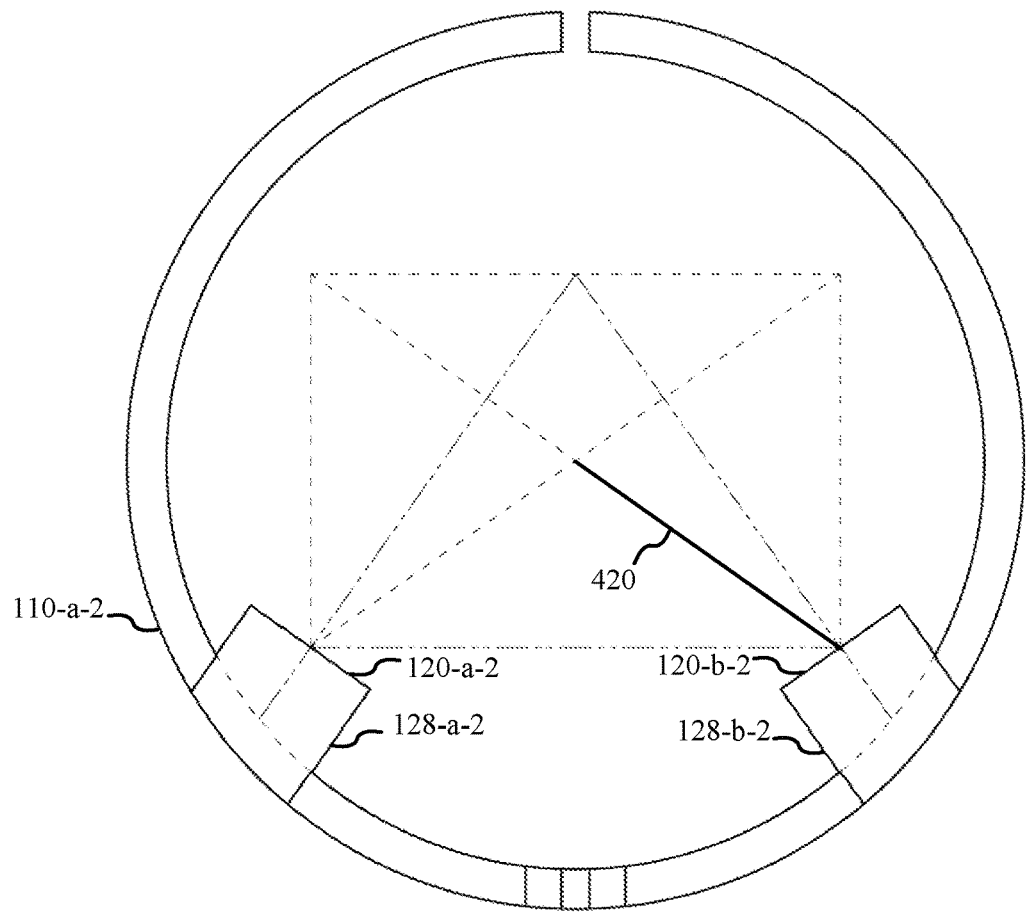

To simplify the explanation, it may be easier to start with the idea of two concentric spheres. An inner sphere circumscribes the inner tetrahedron where the faces of the transducers contact the vertices of the tetrahedron, and an outer sphere circumscribing the back of the transducers. The equation of the inner sphere is the standard tetrahedron circumsphere radius equation:

$$CircumsphereRadius = \sqrt{\frac{3}{8}} * A$$

where A is the distance between vertexes of the tetrahedron. FIG. 4B shows the circumsphere radius 420 when viewed from a vertical slice through the lower pair of transducers.

Figure 4C:
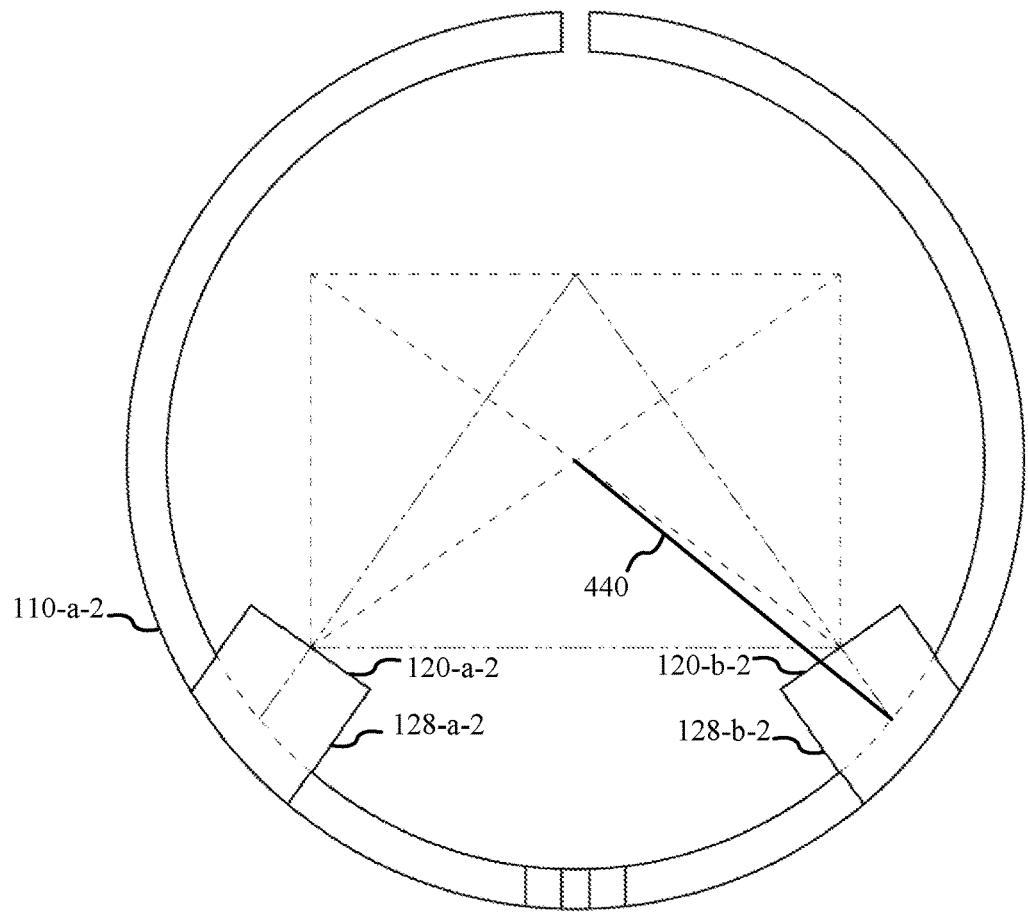
Figure 4D:
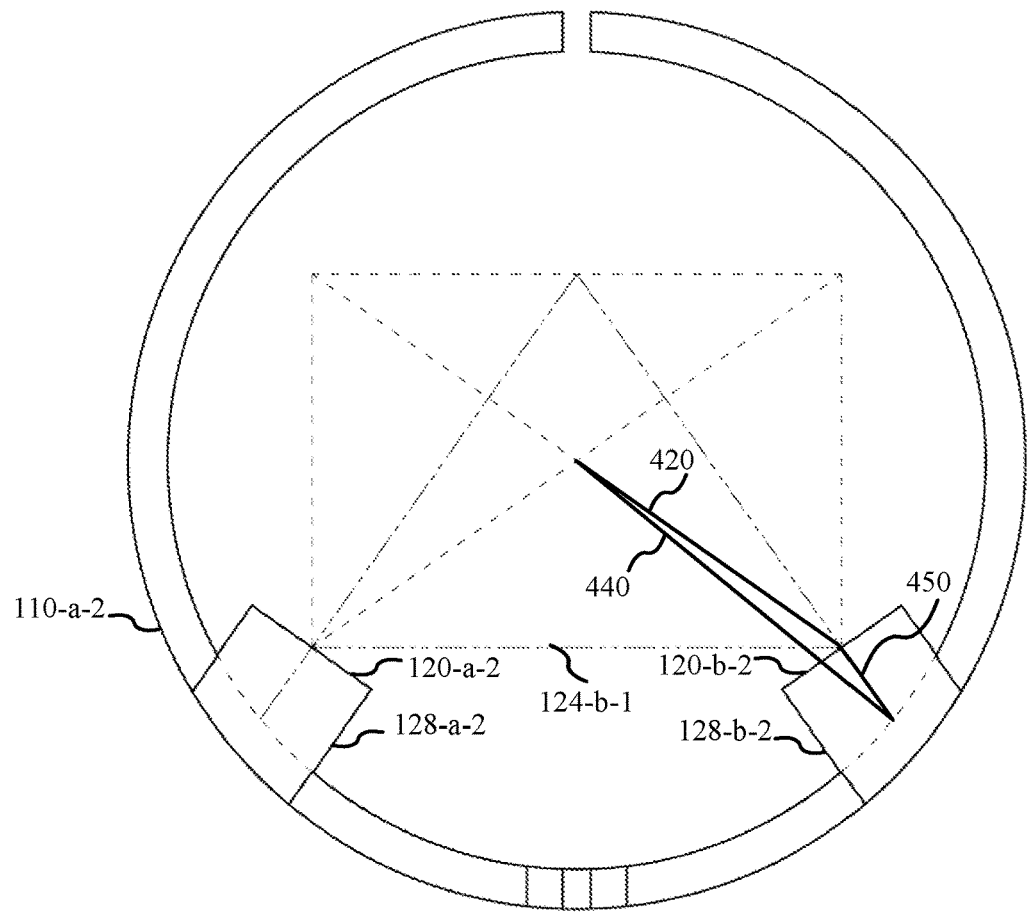

FIG. 4C shows the radius 440 of the outer sphere reflected as the distance from the center to the back of the transducer 120-b-2. In some embodiments, the outer sphere extends to the outer edge of the support ring or other portions of the transducer housing besides the face of the transducer. FIG. 4D shows the radius 440 of the outer sphere as the hypotenuse of the triangle with the other two sides of triangle including the inner sphere radius 420 and the transducer's length 450.

The Law of Cosines may be utilized to calculate the outer radius 440:

$$OuterRadius = \sqrt{a^2 + b^2 - 2ab * COS(\gamma)}$$

where:
  a is the radius of the inner sphere (Circumsphere Radius 420 above);
  b is the length of the transducers 450; and
  γ is the obtuse angle between a 420 and b 450 and is equal to:

$$\gamma = 90 + 2 * \text{ARCCOS}\left(\frac{\sqrt{6}}{3}\right)$$

Inserting the values for the transducer distance (A) and transducer length (L) into the Law of Cosines equation $$OuterRadius = \sqrt{\left(\sqrt{\frac{3}{8}} * A\right)^2 + L^2 - 2\left(\sqrt{\frac{3}{8}} * A\right) * L * \cos\left(90 + 2 * \text{ARCCOS}\left(\frac{\sqrt{6}}{3}\right)\right)}$$

where:
A is the distance between transducers (such as the length of line 124-b-1); and
L is the length of the transducer 450,
which simplifies to:

$$OuterRadius = \sqrt{\frac{3}{8} * A^2 + L^2 + \sqrt{\frac{3}{2}} * A * L * \text{SIN}\left(2 * \text{ARCCOS}\left(\frac{\sqrt{6}}{3}\right)\right)}$$

where:
A is the distance between transducers (such as the length of line 124-b-1); and
L is the length of the transducer 450.

Figure 4E:
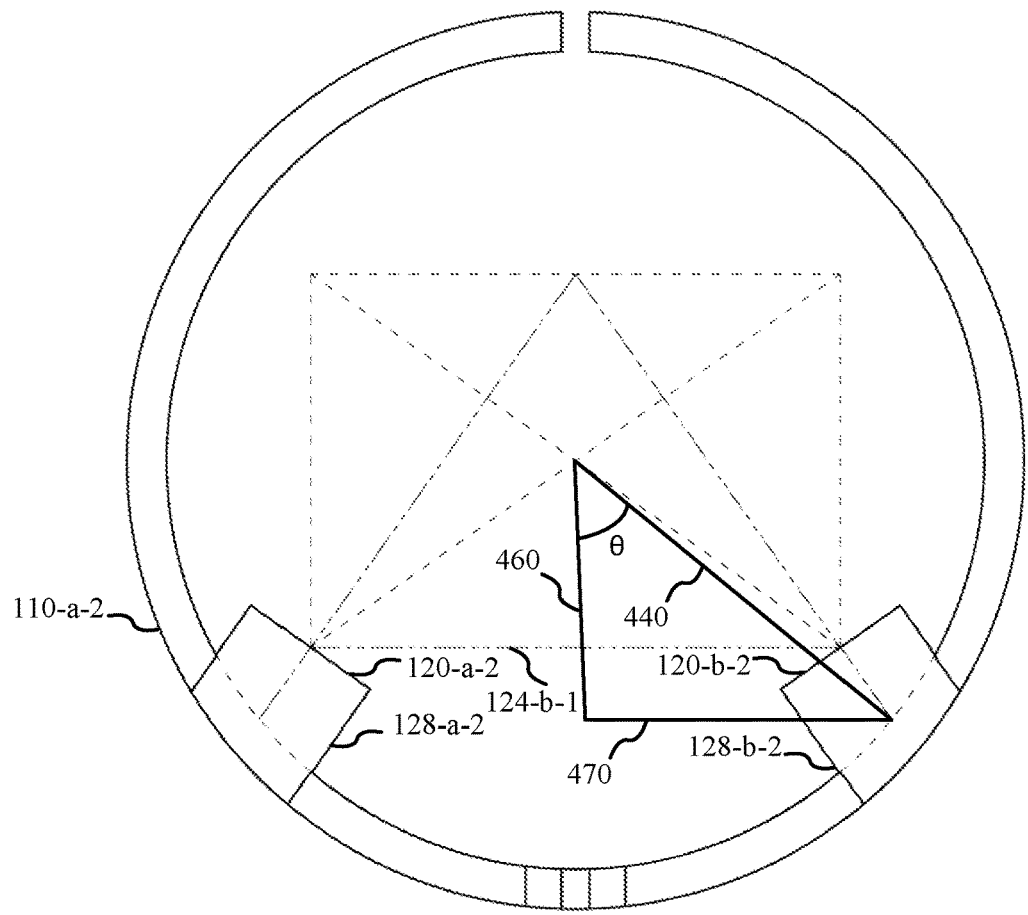

With the outer radius 440 defined, FIG. 4E may help determine the angle from a line that passes through the center of the tetrahedron and intersects the center point of the line 124-b-1 between the transducers 120-a-2 and 120-b-2 on each of the horizontal planes. The angle θ from this vertical line 460 to a line from the center of the tetrahedron to the back of the transducer 470 is shown forming a right triangle. The angle θ may be calculated as:

$$\theta = \text{ARCSIN}\left(\frac{\frac{A}{2} + L * \text{SIN}\left(\text{ARCCOS}\left(\frac{\sqrt{6}}{3}\right)\right)}{OuterRadius}\right)$$

where:
A is the distance between transducers (such as the length of line 124-b-1); and
L is the length of the transducer 450 (see FIG. 4D, for example).

Figure 4F:
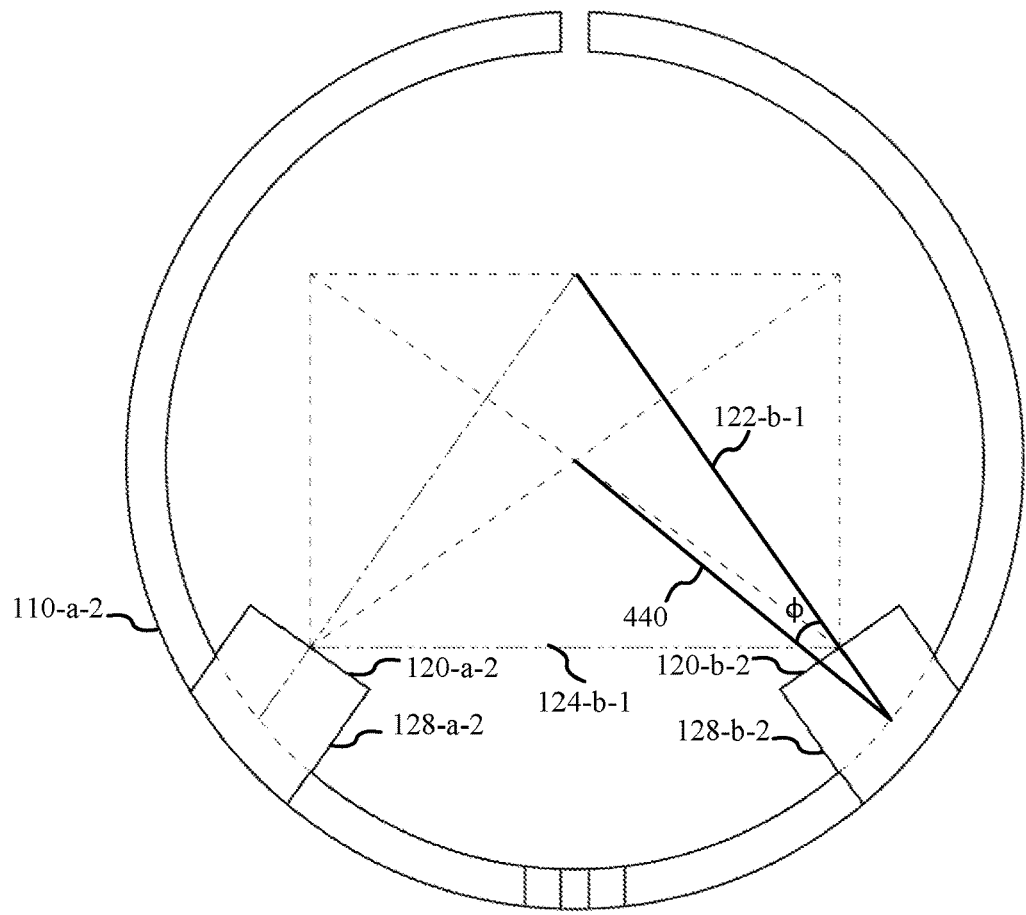

The angle θ generally defines the position from vertical on the outer sphere where the back of the transducer contacts the outer ring, or the acute angle formed between line 440 and the vertical line 460 through the center of the tetrahedron. However, the angle of contact may not be parallel to the radius of the outer sphere 440. The angle that the transducers mount on the ring may be the transducer mounting angle φ defined by the imaginary lines 122-b-1 and outer radius 440 on the outer sphere as shown in FIG. 4F and may be given by the Law of Sines:

$$\frac{\text{SIN}(\varphi)}{\sqrt{\frac{3}{8}} * A} = \frac{\text{SIN}\left(90 + 2 * \text{ARCCOS}\left(\frac{\sqrt{6}}{3}\right)\right)}{OuterRadius}$$

One may solve and simplify for φ:

$$\varphi = \text{ARCSIN}\left(\frac{\text{SIN}\left(90 + 2 * \text{ARCCOS}\left(\frac{\sqrt{6}}{3}\right)\right)}{OuterRadius} * \sqrt{\frac{3}{8}} * A\right)$$

where:
A is the distance between transducers (such as the length of line 124-b-1).

The angle φ generally determines the rotation angle for the transducer face to align with the vertex of the internal equilateral tetrahedron and aims at the center point on the line between the two opposing transducers.

Figure 4G:
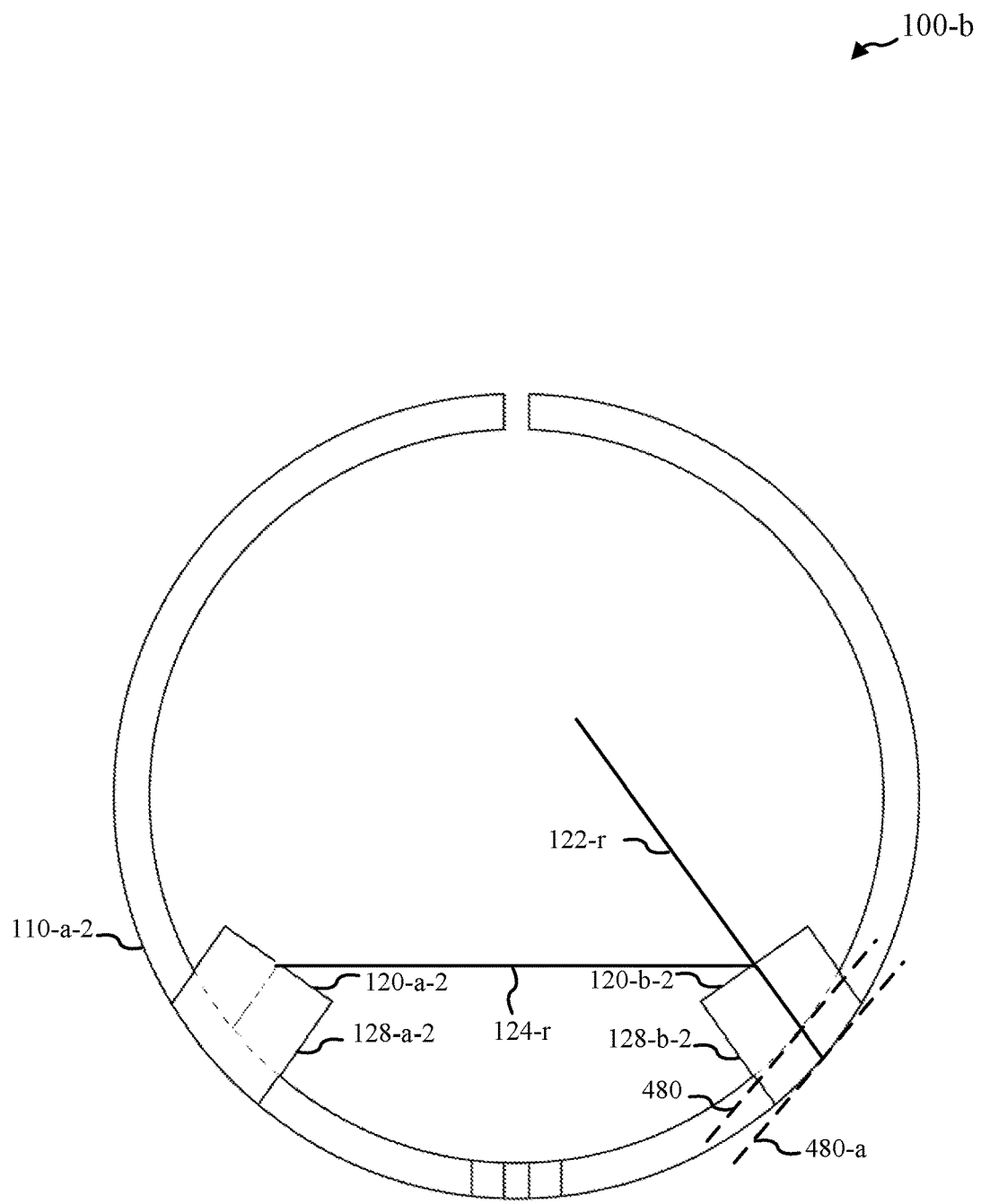

FIG. 4G shows aspects of wind sensor device 100-b that may further facilitate an understanding of the possible orientations of a transducer 120 with respect to a support rings 110 in accordance with various embodiments. For example, in some embodiments, an angle formed between a central axis 122-r, which may be an example of line 122-b-1, through the center of the face of the transducer 120-b-2 and an imaginary line 124-r, which may be an example of line 124-b-1, formed between the center of the face of the transducer 120-b-2 and the center of the face of the transducer 120-a-2 is greater than 40 degrees. The angle formed between the central axis 122-r through the center of the face of the transducer 120-b-2 and the imaginary line 124-r formed between the center of the face of the transducer 120-b-2 and the center of the face of the transducer 120-a-2 may be between 52 degrees and 58 degrees. From another perspective, the back of the transducer housing 128-b-2 coupled with support ring 110-a-2 such that the central axis 122-r through the center of the face of the transducer 120-b-2 may form an angle other than 90 degrees with respect to an intersection point between the central axis through the center of the face of the transducer 120-a-2 and a tangent line 480 formed with respect to the support ring 110-a-2; in this example, the back of the transducer housing 128-b-2 may be considered to be located such that it intersects the support ring 110-a-2 along an inner portion of the support ring 110-a-2. The back of the transducer 128-b-2 may be considered at other locations on the housing also, including but not limited to a portion of the transducer housing 128-b-2 and an outer portion of the support ring 110-a-2; a second tangent 480-a is shown in this respect at an intersection point between the central axis 122-r through the center of the face of the transducer 120-b-2 and the tangent line 480-a formed with respect to the support ring 110-a-2. As discussed in more detail with respect to FIGS. 4A-4F, the angle formed between the central axis 122-r of the transducer 120-b-2 with respect to the support ring 110-a-2 generally depends on at least a size of the support ring 110-a-2 (such as its radius or other measure) or a length of the transducer housing 128-b-2. Similar relationships may be found for the other transducers, their housings, and support ring.

Figure 5:
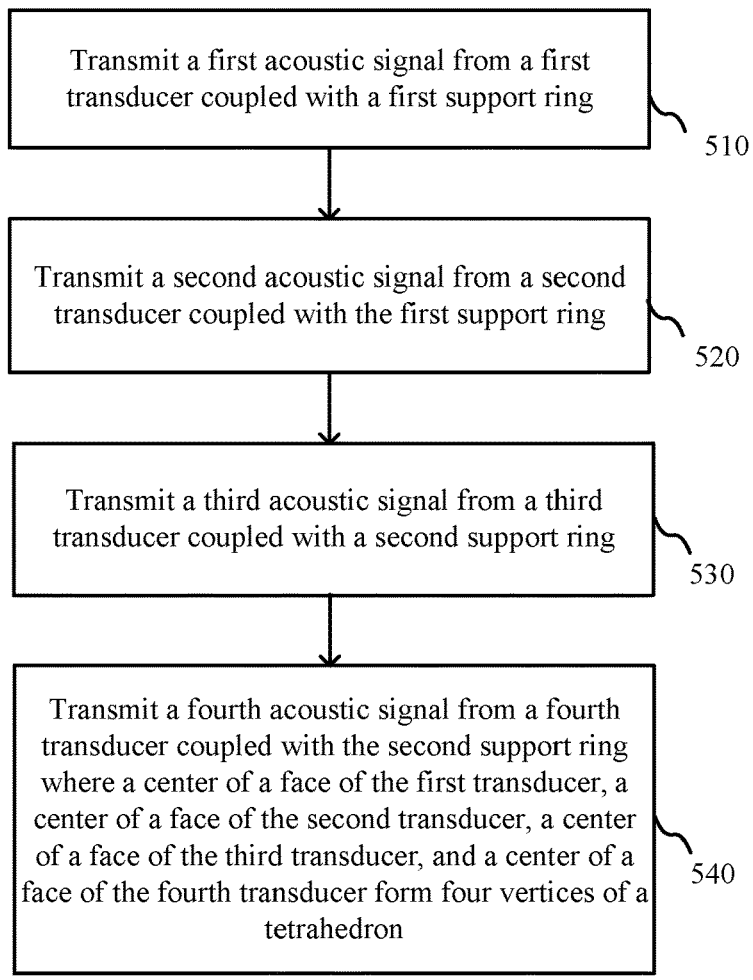
FIG. 5 shows a flow diagram of a method of wind measurement in accordance with various embodiments.

Turning now to FIG. 5, a method 500 of wind measurement is provided in accordance with various embodiments. Method 500 may be implemented with a variety of devices and/or systems as shown and/or described with respect to FIG. 1, FIG. 2A, FIG. 2B, FIG. 2C, FIG. 2D, FIG. 3A, FIG. 3B, FIG. 3C, FIG. 4A, FIG. 4B, FIG. 4C, FIG. 4D, FIG. 4E, FIG. 4F, and/or FIG. 4G.

At block 510, a first acoustic signal may be transmitted from a first transducer coupled with a first support ring. At block 520, a second acoustic signal may be transmitted from a second transducer coupled with the first support ring. At block 530, a third acoustic signal may be transmitted from a third transducer coupled with a second support ring. At block 540, a fourth acoustic signal may be transmitted from a fourth transducer coupled with the second support ring. A center of a face of the first transducer, a center of a face of the second transducer, a center of a face of the third transducer, and a center of a face of the fourth transducer may form four vertices of a tetrahedron.

The transmitted signals from steps 510, 520, 530, and 540 can happen in a variety of orders and may form one or more cycles. Merely by way of example, one sequence of transmissions may occur as step 510, 520, 530, and 540. Another sequence may include 510, 540, 520, and 530. Another example may include the sequence 510, 530, 520, and 540. Other orders may be utilized, including different transducers starting the sequence.

Some embodiments of the method 500 of wind measurement include: receiving a first portion of the first acoustic signal at the third transducer; receiving a second portion of the first acoustic signal at the fourth transducer; receiving a first portion of the second acoustic signal at the third transducer; receiving a second portion of the second acoustic signal at the fourth transducer; receiving a first portion of the third acoustic signal at the first transducer; receiving a second portion of the third acoustic signal at the second transducer; receiving a first portion of the fourth acoustic signal at the first transducer; and receiving a second portion of the fourth acoustic signal at the second transducer.

Some embodiments of the method 500 of wind measurement further include determining three orthogonal wind speeds based on at least: receiving the first portion of the first acoustic signal at the third transducer; receiving the second portion of the first acoustic signal at the fourth transducer; receiving the first portion of the second acoustic signal at the third transducer; receiving the second portion of the second acoustic signal at the fourth transducer; receiving the first portion of the third acoustic signal at the first transducer; receiving the second portion of the third acoustic signal at the second transducer; receiving the first portion of the fourth acoustic signal at the first transducer; and/or receiving the second portion of the fourth acoustic signal at the second transducer.

In some embodiments of the method 500 of wind measurement, the first transducer and the second transducer are directed at a center along an imaginary line formed between the center of the face of the third transducer and the center of the face of the fourth transducer. The third transducer and the fourth transducer may be directed at a center along an imaginary line formed between the center of the face of the first transducer and the center of the face of the second transducer.

In some embodiments of the method 500 of wind measurement, the first support ring and the second support ring are oriented perpendicular to each other. In some embodiments of the method 500 of wind measurement, the tetrahedron forms an equilateral tetrahedron. In some embodiments of the method 500 of wind measurement, the first transducer, the second transducer, the third transducer, and the fourth transducer are each oriented away from a center of the tetrahedron. In some embodiments of the method 500 of wind measurement, the wind sensor device includes no more than four transducers. In some embodiments of the method 500 of wind measurement, a center of a back of a first transducer housing, a center of a back of a second transducer housing, a center of a back of a third transducer housing, and a center of a back of a fourth transducer housing form a non-equilateral tetrahedron.

In some embodiments of the method 500 of wind measurement, an angle formed between a central axis through the center of the face of the first transducer and an imaginary line formed between the center of the face of the first transducer and the center of the face of the second transducer is greater than 40 degrees. The angle formed between the central axis through the center of the face of the first transducer and the imaginary line formed between the center of the face of the first transducer and the center of the face of the second transducer is between 52 degrees and 58 degrees. In some embodiments of the method 500 of wind measurement, the back of the first transducer housing is coupled with first support ring such that the central axis through the center of the face of the first transducer forms an angle other than 90 degrees with respect to an intersection point between the central axis through the center of the face of the first transducer and a tangent line formed with respect to the first support ring. In some embodiments of the method 500 of wind measurement, the back of the first transducer housing is coupled with first support ring such that the central axis through the center of the face of the first transducer forms an angle with respect to the first support ring that depends on at least a size of the first support ring or a length of the first transducer housing. In some embodiments of the method 500 of wind measurement, the first support ring includes a first circular support ring and the second support ring includes a second circular support ring.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figures.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A wind sensor device comprising:
   a first support ring;
   a second support ring;
   a first transducer coupled with the first support ring;
   a second transducer coupled with the first support ring, wherein an angle formed between a central axis through the center of the face of the first transducer and an imaginary line formed between the center of the face of the first transducer and the center of the face of the second transducer is greater than 40 degrees and wherein a back of the first transducer housing is coupled with first support ring such that the central axis through the center of the face of the first transducer forms an angle other than 90 degrees with respect to an intersection point between the central axis through the center of the face of the first transducer and a tangent line formed with respect to the first support ring;
   a third transducer coupled with the second support ring; and
   a fourth transducer coupled with the second support ring, wherein a center of a face of the first transducer, a center of a face of the second transducer, a center of a face of the third transducer, and a center of a face of the fourth transducer form four vertices of a tetrahedron.

2. The wind sensor device of claim 1, wherein:
   the first transducer and the second transducer are directed at a center along an imaginary line formed between the center of the face of the third transducer and the center of the face of the fourth transducer; and
   the third transducer and the fourth transducer are directed at a center along an imaginary line formed between the center of the face of the first transducer and the center of the face of the second transducer.

3. The wind sensor device of claim 1, wherein the first support ring and the second support ring are oriented perpendicular to each other.

4. The wind sensor device of claim 1, wherein the tetrahedron forms an equilateral tetrahedron.

5. The wind sensor device of claim 1, wherein the first transducer, the second transducer, the third transducer, and the fourth transducer are each oriented away from a center of the tetrahedron.

6. The wind sensor device of claim 1, wherein the wind sensor device includes no more than four transducers.

7. The wind sensor device of claim 1, wherein a center of a back of a first transducer housing, a center of a back of a second transducer housing, a center of a back of a third transducer housing, and a center of a back of a fourth transducer housing form a non-equilateral tetrahedron.

8. The wind sensor device of claim 1, wherein the angle formed between the central axis through the center of the face of the first transducer and the imaginary line formed between the center of the face of the first transducer and the center of the face of the second transducer is between 52 degrees and 58 degrees.

9. The wind sensor device of claim 1, wherein a back of a first transducer housing is coupled with the first support ring such that a central axis through a center of a face of the first transducer forms an angle with respect to the first support ring that depends on at least a size of the first support ring or a length of the first transducer housing.

10. The wind sensor device of claim 1, wherein the first support ring includes a first circular support ring and the second support ring includes a second circular support ring.

11. A wind sensor device comprising:
    a first support ring;
    a second support ring, wherein the first support ring and the second support ring are oriented perpendicular to each other;
    a first transducer coupled with the first support ring;
    a second transducer coupled with the first support ring;
    a third transducer coupled with the second support ring; and
    a fourth transducer coupled with the second support ring, wherein a center of a face of the first transducer, a center of a face of the second transducer, a center of a face of the third transducer, and a center of a face of the fourth transducer form four vertices of a tetrahedron.

12. The wind sensor device of claim 11, wherein:
    the first transducer and the second transducer are directed at a center along an imaginary line formed between the center of the face of the third transducer and the center of the face of the fourth transducer; and
    the third transducer and the fourth transducer are directed at a center along an imaginary line formed between the center of the face of the first transducer and the center of the face of the second transducer.

13. The wind sensor device of claim 11, wherein the tetrahedron forms an equilateral tetrahedron.

14. The wind sensor device of claim 11, wherein the first transducer, the second transducer, the third transducer, and the fourth transducer are each oriented away from a center of the tetrahedron.

15. The wind sensor device of claim 11, wherein the wind sensor device includes no more than four transducers.

16. The wind sensor device of claim 11, wherein a center of a back of a first transducer housing, a center of a back of a second transducer housing, a center of a back of a third transducer housing, and a center of a back of a fourth transducer housing form a non-equilateral tetrahedron.

17. The wind sensor device of claim 11, wherein an angle formed between a central axis through the center of the face of the first transducer and an imaginary line formed between the center of the face of the first transducer and the center of the face of the second transducer is greater than 40 degrees.

18. The wind sensor device of claim 17, wherein the angle formed between the central axis through the center of the face of the first transducer and the imaginary line formed between the center of the face of the first transducer and the center of the face of the second transducer is between 52 degrees and 58 degrees.

19. The wind sensor device of claim 17, wherein a back of the first transducer housing is coupled with first support ring such that the central axis through the center of the face of the first transducer forms an angle other than 90 degrees with respect to an intersection point between the central axis through the center of the face of the first transducer and a tangent line formed with respect to the first support ring.

20. The wind sensor device of claim 11, wherein a back of a first transducer housing is coupled with the first support ring such that a central axis through a center of a face of the first transducer forms an angle with respect to the first support ring that depends on at least a size of the first support ring or a length of the first transducer housing.

21. The wind sensor device of claim 11, wherein the first support ring includes a first circular support ring and the second support ring includes a second circular support ring.

* * * * *